Aug. 24, 1965    P. C. PATIN    3,202,740
METHOD OF STRESSING THE REINFORCING
MEMBERS OF REINFORCED CONCRETE
Filed May 2, 1961    5 Sheets-Sheet 1

Aug. 24, 1965    P. C. PATIN    3,202,740
METHOD OF STRESSING THE REINFORCING
MEMBERS OF REINFORCED CONCRETE
Filed May 2, 1961    5 Sheets-Sheet 3
Fig. 12
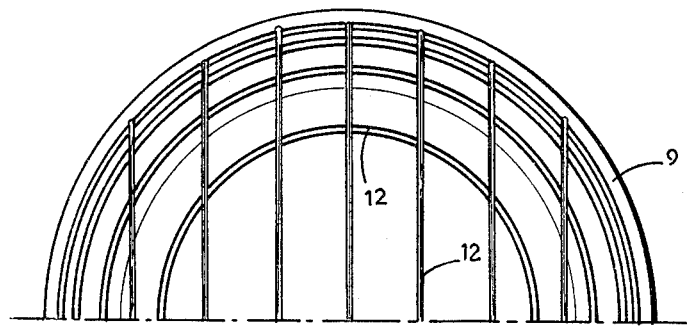
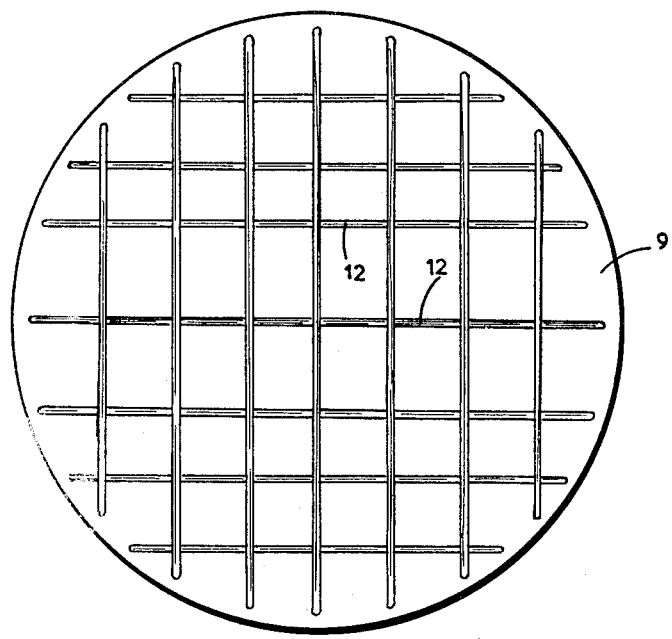
Fig. 11

Fig. 13
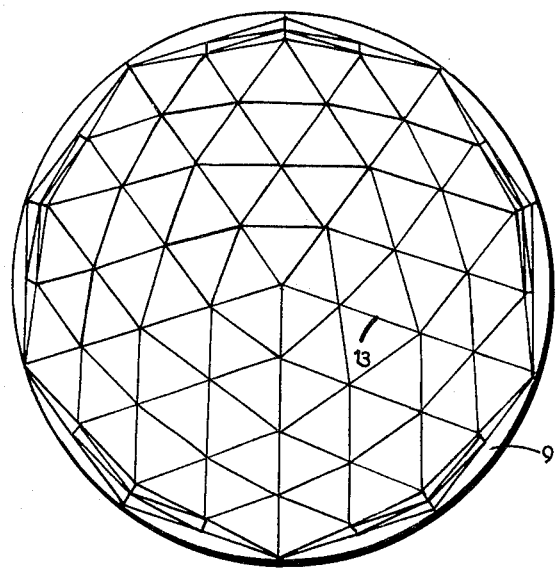
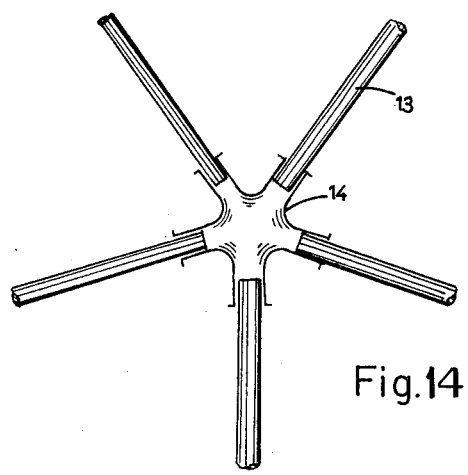
Fig. 14

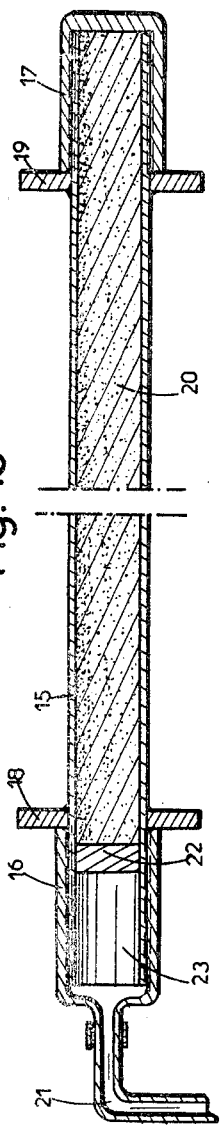
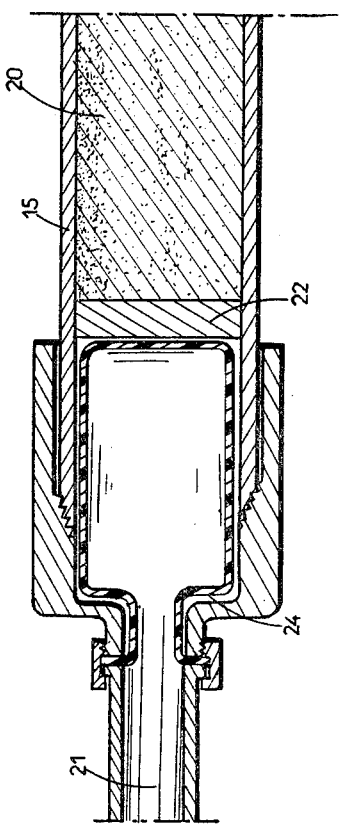
Fig. 15
Fig. 16

3,202,740
METHOD OF STRESSING THE REINFORCING MEMBERS OF REINFORCED CONCRETE
Pierre C. Patin, Paris, France, assignor to Compagnie d'Ingenieurs et Techniciens d'Etudes (C.I.T.E.), Paris, France, a company of France
Filed May 2, 1961, Ser. No. 107,103
Claims priority, application France, May 4, 1960, 826,211; Aug. 3, 1960, 834,839
4 Claims. (Cl. 264—100)

The present invention has as an object a method of stressing the reinforcing members of reinforced concrete for the manufacture of reinforced concrete members.

It is known that the prestressing of concrete has the object of obtaining a compression inside the concrete before the construction is subjected to a load so that at the moment of this loading the application of a new state of equilibrium will not cause tractional stresses to appear. This compression is usually obtained by means of tensioned steel members and this tensioning is itself obtained by means of jacks which bear either upon the construction itself or on a rigid structure or any similar device prepared for this purpose.

Iron-banding or hooping also has as its object to bring about a compression inside a member, a compression intended to retard the occurrence of tractional stresses in any plane.

It is a further object of the invention to allow an internal prestressing to be obtained without necessitating any tensioning by means of jacks.

According to the invention there is provided a method for tensioning the reinforcing members of reinforced concrete, comprising the steps of putting reinforcing members constituted by sealed tubes, into communication with a source of liquid under pressure, applying hydraulic pressure to the inside of said tubes, running in the concrete over said tubes, and releasing said pressure after the concrete has hardened.

Figure 1:
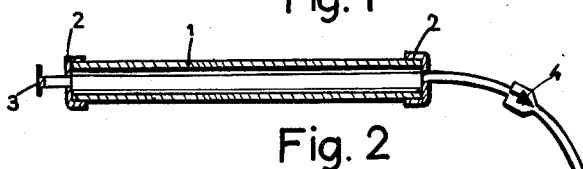
Figure 2:
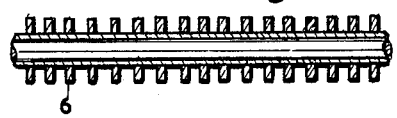
Figure 3:
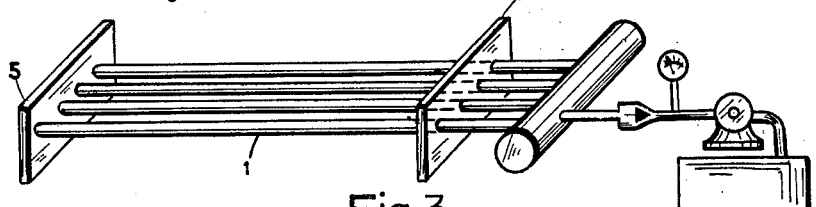
Figure 4:
Figure 5:
Figure 6:
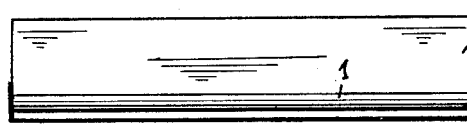
Figure 7:
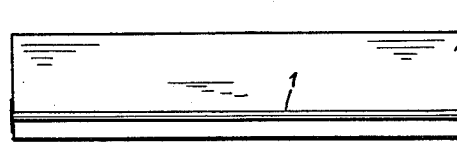
Figure 8:
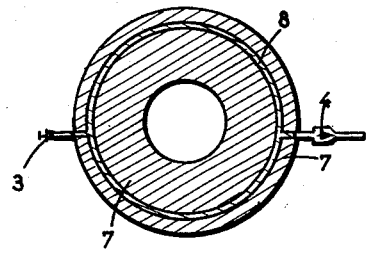
Figure 10:
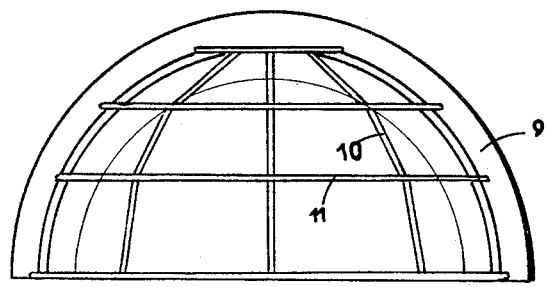
Figure 9:
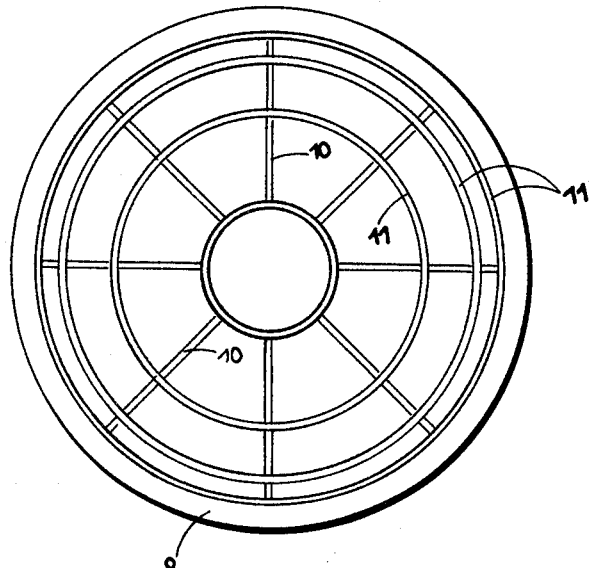

In order that the invention shall be more clearly understood, reference will now be made to the accompanying drawings which show some embodiments thereof by way of example, and in which:

FIGURE 1 shows a single reinforcing tube constructed for use in accordance with the invention, FIGURE 2 shows a reinforcing tube iron-banded or hooped by means of collars, FIGURE 3 shows an assembly of reinforcing tubes with holding devices, FIGURES 4 to 7 show different stages of the operation of the method of the invention using a single reinforcing tube for illustration purposes, FIGURE 8 is a section through a cylindrical enclosure provided with an annular reinforcing tube through a plane perpendicular to the axis of the enclosure, FIGURE 9 is a plan view of a prestressed reinforced concrete hemisphere comprising a network of reinforcing members according to the invention, said members being shown in plain lines, FIGURE 10 is an elevation of the hemisphere shown in FIGURE 9, FIGURES 11 and 12 are similar views of a modification, FIGURE 13 is a view similar to that shown in FIGURE 9, of another modification, FIGURE 14 diagrammatically shows the method of joining the tubes in the embodiment of FIGURE 13, FIGURE 15 is a longitudinal section through a tube capable of being stretched by the method according to the invention, and FIGURE 16 is a section on a larger scale of a modification, the section being similar to that shown in FIGURE 15, but only one of the ends of the tube being shown.

Referring to the drawings, FIGURE 1 shows a prestressing tube according to the invention. This tube 1, made of steel, which is preferably weldable, is blocked up at its ends by stoppers 2 of suitable shape, which can either be screwed on or welded. One of these stoppers includes a cock 3, the other an opening with a valve 4 joined by a pipe to a source of hydraulic pressure.

It is known that a thin tube of internal diameter $d=2r$, of thickness $e$ and subjected to an internal pressure $p$, exhibits longitudinal and transverse tractional stresses, the respective values of which are:

$$n_z = \frac{pr}{2e}$$

and $$n_a = \frac{pr}{e}$$

The transverse stress is twice the longitudinal stress.

If the tube is arranged in such a way as to be able to bear against the concrete at its ends after hardening, the removal of the internal pressure will bring about the transferrence on to the concrete of the longitudinal tension forces in the tube. On the other hand the transverse stresses will disappear while bringing about a slight decrease in the transverse section of the tube. By reason of this decrease in transverse section, it is possible that certain separating actions will take place between the concrete and the tube, although certain factors can act in the opposite direction (shrinkage, the influence of the Poisson coefficient of steel and concrete, the behavior of concrete in traction).

However that may be, it is impossible with certainty to rely solely on the adhesion of the concrete to the tube to transmit the forces and it is preferable to ensure this transmission with the aid of plates or collars 5 welded to the ends of the tubes.

On the other hand the effect of the Poisson coefficient decreases the longitudinal expansion of the tube under the effect of pressure. In fact this expansion has the value:

$$w = \frac{n_z}{e}(1 - 2\sigma)$$

that is to say that in the normal case, when $\sigma = 0.25$, it is only half the expansion under the same stress of the tube without the pressure. In order to avoid this double effect of loss of expansion, due on the one hand to the relative value of the longitudinal and transverse stresses, and on the other hand to the Poisson effect, it is necessary to separate the longitudinal work which must be borne by the tube and the transverse work which must be taken by iron-banding or hooping.

This iron-banding or hooping can for example be obtained either by means of stretched coiled wires or with the aid of steel collars 6 which are put in such a way that the transverse stress of the tube under tension shall be as small as possible. FIGURE 2 represents a tube provided with such collars 6.

Due to the collars 6. the adhesion of the concrete to the tube is more certain throughout its length.

FIGURE 3 shows tubular reinforcing members for a straight beam, and designed according to the present invention. For the sake of simplification non-iron-banded or hooped tubes have been used. The iron-work comprises a certain number of tubes, 1, the ends of which pass through two plates 5, to which they are welded. A conventional transverse metal bracing can be used to interconnect the tubes and to resist the disintegration of the concrete, FIGURES 4 to 7 illustrate the prestressing principle. At the moment when the tubes 1 are put under pressure they expand and take up the position shown in FIGURE 5 (for the sake of clarity the deformations have been very much exaggerated in the figure).

After the concrete 7 has been run onto the thus prepared iron-work (FIGURE 6) and after it has hardened, the internal pressure within the tubes is released. At the end of this operation a slight shortening of the assembly thus constituted takes place, the steel members losing, during this shortening process, a portion of their tension, while the concrete is put into compression (FIGURE 7).

Thus is obtained the state which is well-known under the name of prestressed concrete.

This method is particularly advantageous in the case of circular hooping and prestressing. In fact such a prestressing can be carried out with the aid of tubes wound round on themselves in the form of rings or a helix, the importance of this method being that there is no longer any problem of continuity in the prestressing members.

By way of example, FIGURE 8 shows a cylindrical member prestressed by this method by means of an annular tube 8. This method can also be applied to more complicated shapes. By way of example, the prestressing of a hemisphere 9 can be carried out either by orthogonal tube systems (meridians 10 and parallels 11 in FIGURES 9 and 10), or by networks of tubes 12 placed in parallel planes in two orthogonal planes (FIGURES 11 and 12), or finally by means of linked polyhedric networks 13 constituted by rectilinear members joined by welded multiple unions 14 (FIGURES 13 and 14).

FIGURES 15 and 16 show how the method according to the invention can be put into operation in order to avoid the iron-banding or hooping of the reinforcing tube, the pressure being applied only in limited zones of the tubes.

In FIGURE 15, the tube 15 is closed at its ends by hermetic screwed or welded stoppers 16 and 17. These stoppers can act as supports for collars 18 and 19 which ensure the transmission of the prestressing forces to the concrete after the release of the tension of the tube.

In accordance with the invention, the tube is filled for the greater part of its length with a material 20 which is to receive the forces of compression due to the application of the pressure of the fluid exerted in conduits 21. The material 20 is selected in such a way that it transmits only small pressures to the wall of the tube. One can for example use a sand having a good coefficient of internal friction $\varphi$; it is known that in this case the relation between the transverse stress and the longitudinal stress in the material is equal to the coefficient of thrust, or, theoretically:

$$tg^2\left(\frac{\eta}{4}-\frac{\varphi}{2}\right)$$

One can also use a rigid material such as hardened mortar; the relation between the stresses is then a function of the moduli of elasticity of steel and mortar, the Poisson coefficient of this mortar, and the relation between the thickness and the radius of the tube.

In every case the transverse stress is only a fraction of the longitudinal stress.

The material 20 which is thus used is separated by a sealed piston 22 from a chamber 23 in which the pressure of the fluid is applied.

In order to prevent the friction of the material 20 on the wall of the tube 15 from bringing about a transfer of the forces of compression onto this tube, a covering of grease can be interposed between the tube 15 and the material 20.

Precautions should preferably be taken, when putting it in place, that this layer of grease is kept whole in order to ensure the sealing of the piston 22 and the stoppers 16 and 17. In particular the sealing of the chamber 23 can be ensured by the use of a bladder of plastic material 24 (FIGURE 16).

The stopper 17 may also be formed like the stopper 16 and may include a pressure device.

It will be understood that the invention is not limited by the operative details which have just been described, these being capable of being modified without departing from the scope of the invention.

I claim:
1. A method for tensioning the reinforcing members of reinforced concrete comprising the steps of lubricating the interiors of a plurality of tubes having means immovably attached thereto engaging the concrete for applying compression to the concrete when the fluid pressure is released, substantially filling said tubes with a solid material, then sealing the tubes, then applying a fluid pressure in said tubes upon an end of said solid material longitudinally expanding said tubes, then pouring concrete around and over said tubes and then releasing the pressure after the concrete has hardened about and engaged said tubes whereby said tubes contract and stress the concrete.

2. A method as described in claim 1, said fluid pressure being applied to said solid material by a piston.

3. A method as described in claim 1 including the steps of engaging a piston with the end of said solid material, sealing said piston with respect to said solid material and then applying the fluid pressure to said piston.

4. A method as described in claim 1 including the steps of substantially filling said tubes with a sand and then applying the fluid pressure in said tubes upon said sand.

References Cited by the Examiner

UNITED STATES PATENTS

| | | |
|---|---|---|
| 1,965,748 | 7/34 | Mitchell. |
| 2,226,201 | 12/40 | Freyssinet. |
| 2,705,360 | 4/55 | Leonhardt _____ 25—118 XR |
| 2,771,655 | 11/56 | Nerve _____ 25—118 XR |
| 2,844,023 | 7/58 | Maiwurm _____ 50—128 |

FOREIGN PATENTS 502,565    11/54    Italy.

ROBERT F. WHITE, *Primary Examiner.*

MICHAEL V. BRINDISI, ALEXANDER H. BRODMERKEL, *Examiners.*